United States Patent [19]

Agrawal et al.

[11] Patent Number: 5,647,058
[45] Date of Patent: Jul. 8, 1997

[54] METHOD FOR HIGH-DIMENSIONALITY INDEXING IN A MULTI-MEDIA DATABASE

[75] Inventors: Rakesh Agrawal, San Jose; William Robinson Equitz, Palo Alto, both of Calif.; Christos Faloutsos, Silver Spring, Md.; Myron Dale Flickner; Arun Narasimha Swami, both of San Jose, Calif.

[73] Assignee: International Business Machines Corporation, Armonk, N.Y.

[21] Appl. No.: 607,922

[22] Filed: Feb. 28, 1996

Related U.S. Application Data

[63] Continuation of Ser. No. 66,759, May 24, 1993, abandoned.
[51] Int. Cl.$^6$ .................................................. G06F 17/30
[52] U.S. Cl. ............... 395/601; 364/282.1; 364/DIG. 1; 395/615
[58] Field of Search ................... 364/DIG. 1, DIG. 2; 395/600, 154; 382/27, 30, 41, 43, 46, 48

[56] References Cited

U.S. PATENT DOCUMENTS

| | | | |
|---|---|---|---|
| 4,817,176 | 3/1989 | Marshall et al. | 382/43 |
| 4,885,703 | 12/1989 | Deering | 364/522 |
| 5,123,088 | 6/1992 | Kasahara et al. | 395/159 |
| 5,161,204 | 11/1992 | Hutcheson et al. | 382/16 |
| 5,274,714 | 12/1993 | Hutcheson et al. | 382/15 |
| 5,325,445 | 6/1994 | Herbert | 382/38 |

OTHER PUBLICATIONS

J. H. Friedman et al., An Algorithm for Finding Nearest Neighbors, IEEE Transactions on Computers, Oct. 1975, pp. 1000–1006.

T.-Y. Hou et al., A Content–based indexing technique using relative Geometry features, SPIE vol. 1662 Image Storage and Retrieval Sys. 1992, pp. 59–68.

J. E. Gary et al., Shape Similarity–Based Retrieval in Image Database Systems, SPIE vol. 1662 Image Storage and Retrieval Systems, 1992.

A. Califano et al., Multimensional Indexing for Recognizing Visual Shapes, IEEE CH2983–May 1991.

H. V. Jagadish, A Retrieval Technique for Similar Shapes, Proceedings of ACM SIGMOD Jun. 1991, vol. 20, No. 2, pp. 208–217.

C. Faloutsos et al., Diamond–Tree: An Index Structure for High–Dimensionality Approximate Searching, Tech. Research Report, Univ. of Maryland, TR92–97.

R. W. Picard et al., Finding Similar Patterns in Large Image Databases, Media Lab., E15–392, MIT, Proceedings of IEEE Conf. on Acoustics, Speech, and Signal Processing, Minneapolis, MN, Apr. 1993.

(List continued on next page.)

*Primary Examiner*—Thomas G. Black
*Assistant Examiner*—Maria N. Von Buhr
*Attorney, Agent, or Firm*—James C. Pintner; Philip E. Blair

[57] ABSTRACT

A high dimensional indexing method is disclosed which takes a set of objects that can be viewed as N-dimensional data vectors and builds an index which treats the objects like k-dimensional points. The method first defines and applies a set of feature extraction functions that admit some similarity measure for each of the stored objects in the database. The feature vector is then transformed in a manner such that the similarity measure is preserved and that the information of the feature vector $\vec{v}$ is concentrated in only a few coefficients. The entries of the feature vectors are truncated such that the entries which contribute little on the average to the information of the transformed vectors are removed. An index based on the truncated feature vectors is subsequently built using a point access method (PAM). A preliminary similarity search can then be conducted on the set of truncated transformed vectors using the previously created index to retrieve the qualifying records. A second search on the previously retrieved set of vectors is used to eliminate the false positives and to get the results of the desired similarity search.

12 Claims, 4 Drawing Sheets

OTHER PUBLICATIONS

P. W. Foltz et al., Personalized Information Delivery: An Analysis of Information Filtering Methods, Comm. of the ACM, Dec. 1992, vol. 35, No. 12, pp. 51–60.

D. E. Willard, Multidimensional Search Trees that Provide New Types of Memory Reductions, Journal of the Association for Computing Machinery, vol. 34, No. 4, Oct. 1987, pp. 846–858.

D. Casasent et al., Fourier–Transform Feature–Space Studies, Proceeding of SPIE—The International Society for Optical Engineering, vol. 449, Nov. 1983.

METHOD FOR HIGH-DIMENSIONALITY INDEXING IN A MULTI-MEDIA DATABASE

This is a continuation of application Ser. No. 08/066,759 filed on May 24, 1993, now abandoned.

FIELD OF THE INVENTION

Broadly conceived, the present invention relates to database indexing methods, and in particular, to methods that achieve efficient and complete retrieval from a database of high-dimensionality points.

BACKGROUND HISTORY

Databases are repositories of information stored on a storage medium whereafter the data can be retrieved. Many databases today are found in any large institution, such as a bank or a large corporation, and have the size to store millions and millions of records of information, which can be accessed by a user. A record in a database is any clustered set of fields of information, such as an employee's name, address, and serial number, among others. With the volume of these databases ever increasing, accessing the information quickly and effectively, i.e., accurately retrieving all the desired information, continues to be an area of interest.

If the database contains millions of records of information, a query (or request) for all the employees with the identical last name would likely produce multiple records, and require a search of all of the individual records of the database. Clearly, if the database was searched sequentially (in other words from the first record to the last record (then an unduly long length of time would have to pass before a complete answer to a user's query was obtained, consolidated, and returned to the requesting user. Slowdowns in the database's response time due to long information access times are not a tolerable condition in any database system; especially those wherein large amounts of data are continuously and simultaneously accessed and retrieved. Consequently, the database arts have developed many schemes to quickly find the qualifying records such that an entire database scan can be avoided. Database indexes are such schemes used to find a fast path to answer queries on one or more of a record's fields.

Many databases have indexes for the most frequently requested information contained therein. In other words, each such field of information for each record is indexed. An index can be described as a list of distinct attribute record values associated with pointers (i.e., record ids.). Typically the list of values is organized as a B-Tree or as a Hash Table. For instance, all the employees' last names would be indexed such that, when a user query specified the retrieval of all the records with the last name, of Smith, the index table would be quickly scanned for that name, and the pointers would point to the pages in the database in which those matching records resided. Thus by indexing a database's individual fields, queries on the indexed fields enjoy a fast response time.

With the advent of the multi-media environment, wherein images, audio, and video components are stored in a database, multi-media object retrieval has become an area of increasing development in the arts. Current technology permits one to generate, scan, transmit, store, and manipulate large numbers of multi-media objects. In practice, these objects are typically accessed based on indexed textual associations or captions, such as Tree or Bird, which is quite useful. However, this does not permit the flexibility to search on unanticipated features, which are not part of the text caption, and are therefore inadequate to serve as an indexing mechanism for dynamic applications, wherein the search request basis is unanticipated. Many multi-media applications have the additional requirement that the database be able to select all objects which are like (or similar to) some other object. In image databases, there is the need to search through millions of images using non-text based features such as layout, texture, color, other images, and the like. Similarly, in an audio collection, it is important to search for the music scores which have some similarity characteristics to other music scores. Other examples of similarity queries on time-sequence data are to discover stocks with similar movement in stock prices, and to find all past seismological/meteorological patterns that are similar to other patterns from other years' data sets for use in analysis and forecasting.

In order for an object to be retrieved, the object may be first characterized by its features, (e.g. for images such as color, shape, etc.), before being committed to storage within the database. These individual object attributes, when taken altogether, from a feature vector. Feature extraction techniques are known in the arts especially in database image storage and retrieval for accomplishing this task. The feature set must admit some similarity measure, and must also be one that can form the basis of an index into the image collection. If the similarity measure is, for example, the properties of color, texture and shape, a query based on these would be an approximate (or similarity) query.

Many new and emerging applications require that databases be enhanced specifically with the capability to process similarity queries. A similarity search of an image database would typically be a query by a user requesting all the image objects that are similar to a given picture. In database terminology, this is often referred to as a Query-By-Example (QBE). In other words, the database would have to be capable of retrieving images which are similar to the given image based on previously extracted features.

If an image database contains 1 million (or more) objects having approximately 100 features each, the dimensionality creates problems with conventional indexing techniques. As such, it would be enormously expensive in terms of memory and access time to search this database for images with similar features, because of the high dimensionality of the feature vectors. As such, reducing the dimensionality of the indexing of the database is critical in the image database art. This is a problem in highly dimensioned indexing schemes because of the enormity of the problem of multi-dimensionality.

A plurality of database indexing methods for multi-dimensional space, have developed in the arts. The prevailing ones can be grouped roughly into three categories. The first is the $R^*$-trees and the rest of the R-tree and k-d-B tree family. The R-tree based methods seem to be more robust for higher dimensions, provided that the fan-out of the R-tree nodes remains greater than two. The second is linear quad-trees, wherein the effort is proportional to the hyper-surface of the query region. The hyper-surface is known to grow exponentially with the dimensionality. The third is grid-files, which often require a directory that grows exponentially with the dimensionality. Typically, these schemes work well for low dimensionalities (2-d and 3-d spaces). However, the response time of most methods explodes exponentially for high dimensionalities, making sequential scanning more efficient.

Thus, one problem in this art is with approximate matching in a database for objects with many features, such as those images decomposed into multiple features. Looking up high-dimensional objects in a database is slow, because it is hard to build good indexes with large dimensionality as indicated, because most methods reduce quickly to sequential scanning, which consumes considerable time in large sets of highly dimensioned feature space. If one tries to index on a subset of the attributes (ignoring, for instance, the last half of each data vector), one typically ends up with a very inefficient index, which retrieves far too many false positives.

In addition, a dimension reduction technique must guarantee completeness. In other words, a retrieval in answer to a user's query must at least guarantee that all objects that answer the query have been retrieved. If some of the objects that could answer the query cannot be retrieved in answer to the user's query, then the database's response has not been complete. This is an intolerable situation in the database arts. Thus, completeness is one minimum criteria for any dimensionality reduction technique.

Attempts have been tried in this art to solve the indexing problem in high-dimensional spaces. For example, Friedman et at., "An Algorithm for Finding Nearest Neighbors", IEEE Trans. on Computers, (TOC) October 1975, Vol. C-24, pp. 1000–1006 discloses a method which truncates the feature vectors. Since the vectors have a high-dimensionality, the assumption is that it is permissible to categorically ignore as many of the feature components of the vector as is needed to achieve the desired level of performance and dimensionality. This approach corresponds to 'projection' of the multi-dimensional points on the feature-hyperplane containing the axis, wherein searching on these projections produces multiple additional false positives. The number of false hits increases quickly with the number of dimensions, eventually reducing the method to a simple and slow sequential scan. Thus, in a feature space containing tens, hundreds, or more dimensions, the overall performance suffers as a result.

Another work, Faloutsos and Jagadish, "Diamond Tree: An Index Structure for High-Dimensionality Approximate Searching", Technical Report SRC-TR-92-97, Univ. of Maryland, October 1992, mentions that high-dimensional spaces appear often in practice and describes a method to handle points in such a space under the assumption that the feature vectors are sparse, i.e., the majority of the Feature vector's entries are zero. By limiting itself to the non-zero entries only, this method reduces the dimensionality problem to a level where traditional database indexing methods (i.e., R-trees, etc.) can be used.

Yet another work, Hou et al., "A Content-Based Indexing Technique Using Relative Geometry Features", SPIE Image Storage and Retrieval Systems (1992), Vol. 1662, pp. 59–68, discloses a content based indexing technique which is based on the theory of weighted center-of-mass. The method, which is domain-specific to medical images, considers the 4 most important feature vectors out of the original feature vectors as significant, in order to reduce the dimensionality of the index.

Therefore, it is a problem in this art to reduce the dimensionality of a high-dimensional database, while at the same time never missing any objects and reducing false positives when doing a similarity search.

SUMMARY AND OBJECTS OF THE INVENTION

The present invention relates to methods that achieve efficient and complete retrieval from a database or high-dimensionality points.

It is a primary object of the present invention to provide a method for high dimensional indexing which guarantees completeness, and which reduces the propensity for false positives, thus being efficient.

Briefly and to achieve the foregoing objects, a high dimensional indexing method is disclosed. The present method takes a set of objects that can be viewed as N-dimensional data vectors, and builds an index which treats the objects like k-dimensional points, where $k \leq N$, for the purpose of the search. In particular, the present method has the first step of defining and applying a set of feature extraction functions that admit same similarity measure or metric for each of the stored objects in the database. The feature vector is then transformed in a manner such that the metric is preserved, and such that the information (or energy $E(\vec{v})$) of the feature vector $\vec{v}$, $\vec{v} = [v_1, v_2, \ldots, v_n]$ is $$E(\vec{v}) = \left[ \sum_{i=1}^{N} v_i^2 \right],$$

is concentrated in only a few entries of the feature vector, and the other entries of the feature vector contribute little, on the average, to the information of the vector. Then, the feature vectors are truncated, such that the entries within the features vectors which contribute little, on the average to the information of the transformed vectors are removed. An index based on the truncated feature vectors is subsequently built using a point access method (PAM), which is a data structure such as an $R^*$-tree, for multi-dimensional indexing. A preliminary similarity search, i.e., a Euclidean distance range search, is conducted on the set of truncated transformed vectors using the previously created index to retrieve the qualifying records. A second step is performed on the previously retrieved set of vectors to eliminate the false positives and to get the results of the desired similarity search.

Additional objects and advantages of the present invention will be set forth in the description which follows, and in part will be obvious from the description or may be learned by the practice of this invention. The objects and advantages of this invention as described herein may be realized and obtained by means particularly pointed out and distinctly claimed in the appended claims, taken in conjunction with the accompanying drawings and detailed specification.

BRIEF DESCRIPTION OF THE DRAWINGS

In order to further understand the present invention disclosed and claimed herein, the following drawings are provided, in which:

DETAILED DESCRIPTION OF THE PREFERRED EMBODIMENT

The problem in the art is with approximate matching in a database of objects, (e.g., images, audio, time sequences), each object having several features. That is, each object corresponds to a point in a high-dimensional feature space. As a result, performing similarity searches on objects represented in terms of such a high dimensionality feature space is relatively slow, because it is difficult to build good indexes with high dimensionality, given speed and memory constraints. If only a small subset of the features of all the objects in all the images are indexed, such as, for instance, the last half of each feature vector, an inefficient index exists. This results in the retrieval of too many false positives, given any particular query, because half of all the information regarding all the various features was not indexed. While these false positives are to be completely or substantially avoided, the feature extraction has to be complete in the sense that it will not miss relevant objects. The present invention is a method which simultaneously reduces the dimensionality of the data, while never missing any objects, and which reduces the number of false positives produced as a result of a similarity search.

Figure 2:
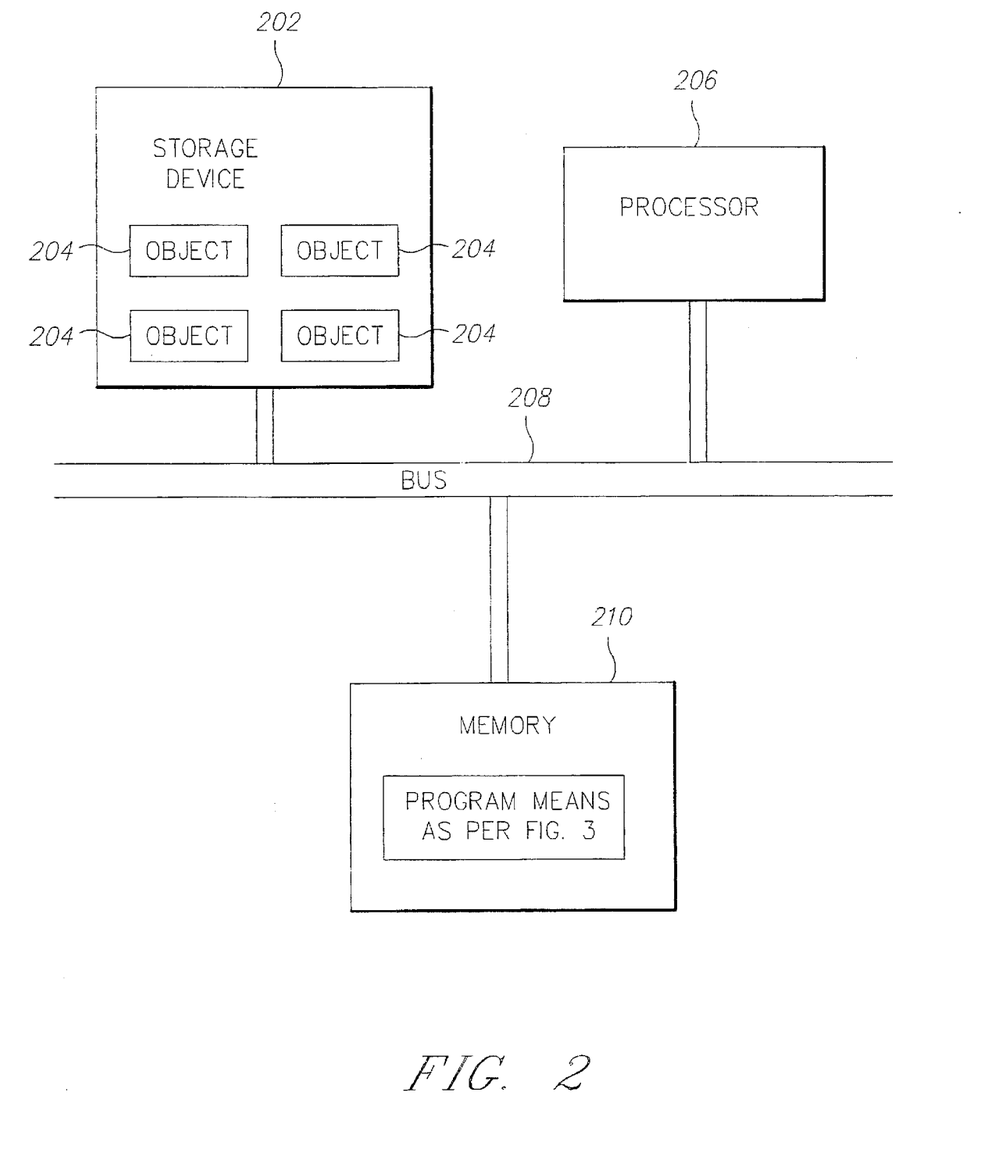
FIG. 2 is a system block diagram showing a preferred embodiment of the system according to the invention.

FIG. 2 shows a system for practicing the invention. A storage device 202 contains a plurality of stored data objects 204. A processor 206, for controlling access to the stored objects 204, is coupled to the storage device 202 through a bus 208. Also coupled through the bus 208 is a memory 210, which contains program code for instructing the processor 206 to perform suitable functions, including controlling access to the stored objects 204 as described above. The program code is preferably implemented as per the flow chart given in FIG. 3 (discussed in detail below).

The present method takes a set of objects that can be viewed as N-dimensional data vectors, and builds an index which treats the objects like k-dimensional points, where $k \leq N$, for the purpose of the search. Since the discussion which follows will focus on the vectors representing the objects, and on processing of those vectors, it will be stated initially that the terms "entries", "coefficients", and "components" will be used synonymously to refer to the elements (or dimensions) of the vectors.

In particular, the present method has the first step of defining and applying a set of feature extraction functions that admit some similarity measure or metric for each of the stored objects in the database. The next step of the preferred embodiment is to transform that measure in a manner such that the metric is preserved, and such that the information of the feature vector is concentrated in only a few coefficients and the other entries of the feature vector contribute little, on the average, to the information of the vector. The feature vectors are then truncated, such that the entries within the feature vectors which contribute little on the average to the total information of the transformed vectors are truncated (ignored). An index based on the truncated feature vectors is subsequently built using a data structure such as an $R^*$-tree for multi-dimensional indexing. When searching for objects similar to a given object, a preliminary similarity search, i.e., a Euclidean distance range search, is conducted on the truncated transformed data using the previously created indexes to retrieve the qualifying objects, plus some false positives. A secondary range search is performed on the retrieved set of objects to eliminate the false positives.

Figure 3:
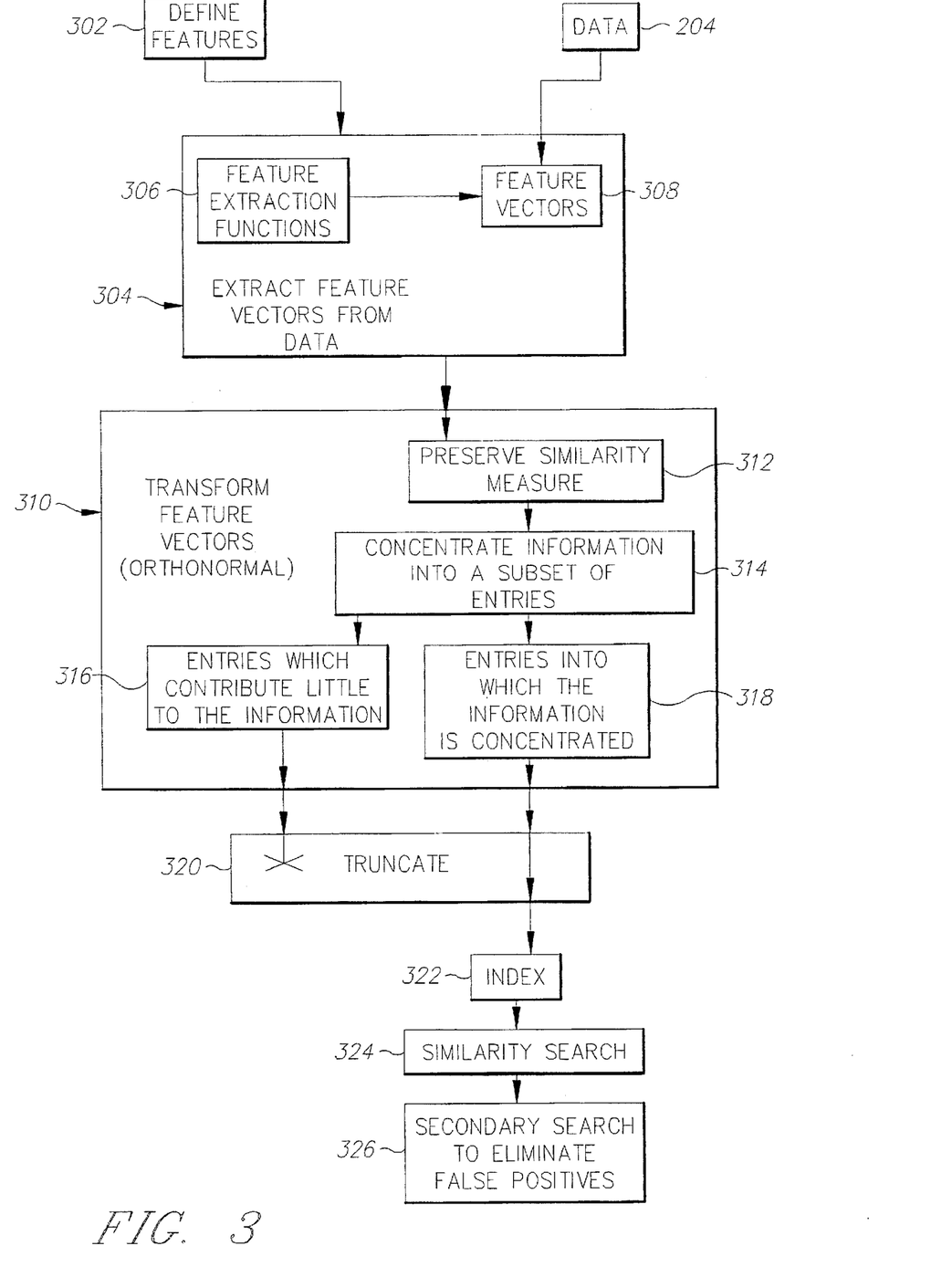
FIG. 3 is a flowchart showing a preferred embodiment of the method of the invention.

FIG. 3 is a flowchart showing method steps in accordance with the invention, and also certain data structures which are pertinent to operation of the method of the invention. For clarity, the legends in FIG. 3 have been made using the convention that data objects are notated with upper case characters, and method steps are notated with lower case characters.

The method has the step of defining a set of features that accurately and adequately describe the contents of an object stored within the database to be searched. The step of applying a set of feature extraction functions for each of the stored objects in the database having a similarity measure includes the use of the identity transformation, wherein the data vector itself becomes the feature vector. These feature sets are typically k-element feature vectors.

The feature set must admit some similarity measure or metric and must also be one that can form the basis of an index into the object collection. For objects, many features are available from the fields of machine vision and object analysis which can be used to describe the object contents. The Euclidean distance function is preferred herein because it is useful in many applications, and because it can be used with other types of similarity measure as long as the similarity measure can be expressed as the Euclidean distance between feature vectors in some feature space. In addition, a valuable feature of the Euclidean distance is that it is preserved under any orthonormal transformation.

For instance, in order to describe the features of the objects in terms of the average color distance, suppose the colors used to describe a feature are given as a triplet (R,G,B) color vector. Assume there are N-pixels in the object and R(p), G(p), and B(p) are the red, green, and blue components respectively with the p-th pixel having intensities typically in the range of 0–255. Under such description, the average color vector for a scene with 50% blue sky and 50% green grass would be, as an RGB color vector, approximately (0,127,127). Then, the average color vector component of an object can be given as $\vec{x} = (R_{avg}, G_{avg}, B_{avg})^T$, wherein:

$$R_{avg} = \left(\frac{1}{N}\right) \sum_{p=1}^{N} R(p) \quad \{1\}$$

$$G_{avg} = \left(\frac{1}{N}\right) \sum_{p=1}^{N} G(p) \quad \{2\}$$

$$B_{avg} = \left(\frac{1}{N}\right) \sum_{p=1}^{N} B(p) \quad \{3\}$$

where the superscript T indicates matrix transposition.

Given the average color vectors $\vec{x}$ and $\vec{y}$ of two objects, the average color distance function $d_{avg}$ can be defined as the Euclidean distance between the 3-dimensional color vectors wherein:

$$d_{avg}^2(\vec{x}, \vec{y}) = (\vec{x} - \vec{y})^T (\vec{x} - \vec{y}) \quad \{4\}$$

Similar features can be extracted for shape, texture, and the like.

For the shape features, it is preferable to use features such as the area, circularity, eccentricity, major axis orientation, and/or a set of algebraic moment invariants. In some applications, it is important that all shapes be non-occluded planar shapes thereby allowing for each shape to be represented as a binary object. In many cases, the shape similarity measure is the weighted Euclidean distance between the corresponding feature vectors, wherein the weights reflect the importance of each feature for similarity extraction.

For texture features such as coarseness, contrast, and directionality, the distance function could be the weighted Euclidean distance in a three dimensional texture space. Since indexing points in the 3-dimensional texture space is straightforward and well known in the art, and because one skilled in this art should already be familiar with 3-d feature indexing techniques, a discussion thereto is omitted.

Although color, shape, and texture are discussed herein as possible features, it should be understood that other features can be used, so long as they have a similarity measure that is expressible as a weighted Euclidean distance.

If it is known that the data and the query features are transformed via an orthonormal transformation of matrix A, then their respective distances will be preserved, since matrix A is orthonormal ($A^T A = I$). The distance can be computed as:

$$(A\vec{x} - A\vec{q})^T(A\vec{x} - A\vec{q}) = (\vec{x} - \vec{q})^T A^T A (\vec{x} - \vec{q}) = \sum_{i=1}^{N} (x_i - q_i)^2 \quad \{6\}$$

Although the Euclidean distance has been discussed and is preferred, any distance measure can be used, as long as a corresponding distance-preserving transform is used in conjunction therewith, and as long as truncation is properly defined.

Having defined and applied the feature extraction functions to the objects, the next step of the preferred embodiment is to transform the feature vector in a manner such that the metric is preserved, and such that the information of the feature is concentrated in only a few coefficients and the other entries (318) of the feature vector contribute little, on the average, to the information of the vector. The information (energy) of $\vec{v} = [v_1, v_2, \ldots, v_n]$ can be defined as $$E(\vec{v}) = \left[ \sum_{i=1}^{N} v_i^2 \right].$$

The distance preservation requirement is met by an orthonormal transform of one of two classes. First, there is the data-dependent transforms such as the Karhunen-Loeve (K-L) transform, which requires all the data in order to determine the transformation matrix. The data-dependent transforms can be fine tuned to the specific data set and therefore can achieve better performance by concentrating the information (or energy) into fewer coefficients. The drawback is that, if the database's data set evolves over time, then expensive data reorganization may be required, e.g., a recomputation of the transformation matrix may be required in order to avoid performance degradation. Second, there exists data-independent transforms such as the Discrete Fourier Transform (DFT), Discrete Cosine Transform (DCT), Harr, or Wavelet Transform, wherein the transformation matrix is determined a priori. Response time will improve with the ability of the transform to concentrate the information, and thereby produce fewer coefficients containing most of the information.

The preferred embodiment herein is discussed in terms of the usage of the Discrete Fourier Transform (DFT), because this transform is well known in the art, coding of the DFT is readily available in numerous texts, and it performs well in concentrating the information in the first few coefficients in most cases.

At this point, it is important herein to conduct a brief overview of the DFT. The algorithms for performing this transformation, such as the Fast Fourier Transform (or FFT) algorithm can be found in one of numerous textbooks in the computer science and computational math arts, and therefore a detailed discussion as to the workings of the FFT algorithm are omitted herein.

The N-point DFT of a vector $\vec{x} = [x_t]$, $t = 0, \ldots, N-1$ is defined to be a sequence $\vec{X}$ of N-complex numbers $X_f$, $f = 0, \ldots, N-1$, given by:

$$X_f = 1/\sqrt{N} \sum_{t=0}^{N-1} x_t \exp\left( \frac{-j 2 \pi f t}{n} \right) \quad \{7\}$$

where j is the imaginary unit $j = \sqrt{-1}$. The vector $\vec{x}$ can be recovered by the inverse transform:

$$x_t = 1/\sqrt{N} \sum_{f=0}^{N-1} X_f \exp\left( \frac{+j 2 \pi f t}{n} \right) \quad \{8\}$$

where $t = 0, \ldots, N-1$. $X_f$ is, in general, a complex number with the exception of $X_0$ which is a real number if the vector $\vec{x}$ is real.

At this point, the components of the transformed feature vectors have been derived from the original feature vector using the Discrete Fourier Transform. The next step of the preferred embodiment of the present method involves taking the transformed feature vectors and truncating the entries that contribute little, on the average, to the information of the transformed vector, such that k entries are kept. The truncation step of the present method requires the selection of a subset of the transformed feature vector set. To achieve this, let $\vec{a}_i \vec{x}$ be the i-th transformed feature where $\vec{a}_i$ is the i-th row of transformation matrix A. Individual matrix elements $\vec{a}_i$ will be set to zero for the N-k least important entries. The sum of {6} can be broken into two parts such that:

$$\sum_{i=1}^{N} (x_i - q_i)^2 - \left( \sum_{i=1}^{k} (\vec{a}_i(\vec{x} - \vec{q}))^2 + \sum_{i=k+1}^{N} (\vec{a}_i(\vec{x} - \vec{q}))^2 \right) = 0 \quad \{9\}$$

By rearrangement, the error introduced by computing the distance on a subset of the transformed features, i.e., setting, for example, the last $\vec{a}_i = 0$ is:

$$\delta = \sum_{i=1}^{N} (x_i - q_i)^2 - \sum_{i=1}^{k} (\vec{a}_i(\vec{x} - \vec{q}))^2 = \sum_{i=k+1}^{N} (\vec{a}_i(\vec{x} - \vec{q}))^2 > 0 \quad \{10\}$$

Note that the truncated distance will always under-estimate the distance, i.e., $\delta > 0$.

The data dependent transforms use least squares error minimization criteria, where statistical pattern recognition enables one to compute the transformation matrix A and to select which rows of matrix A to discard. This is done by setting A to be the eigenvectors of the covariance matrix of the data $\vec{x}$. The rows of matrix A are chosen so that the non-zero entries correspond to the eigenvectors with the largest eigenvalues of the covariant matrix C. In order to achieve dimensionality reduction, the eigenvalues/vectors that contain between 60%–80% of the desired information can be selected. It is important to ensure that the first few coefficients of the transform will carry most of the information. This can be determined by sorting the eigenvalues in decreasing order, i.e., ($\lambda_i \geq \lambda_{i+1}$), and then finding a k such that:

$$0.60 < \sum_{i=0}^{k} \lambda_i / tr(C) < 0.80 \quad \{11\}$$

where tr(C) indicates the trace of the covariant matrix C.

Once the truncated transformed vectors have been obtained an index based on the truncated feature vectors is subsequently built using a multi-dimensional indexing data structure or point-access-method (PAM). Any known prior art multi-dimensional indexing method can be used to build the structure. The preferred one is the $R^*$-tree because it appears to be more robust.

The next step involves conducting a preliminary similarity search, i.e., a Euclidean distance range search, on the truncated transformed data using the previously created indexes. A secondary range search is conducted on the returned objects from the index search to get the results of the desired similarity search without the additional false hits.

Figure 1A:
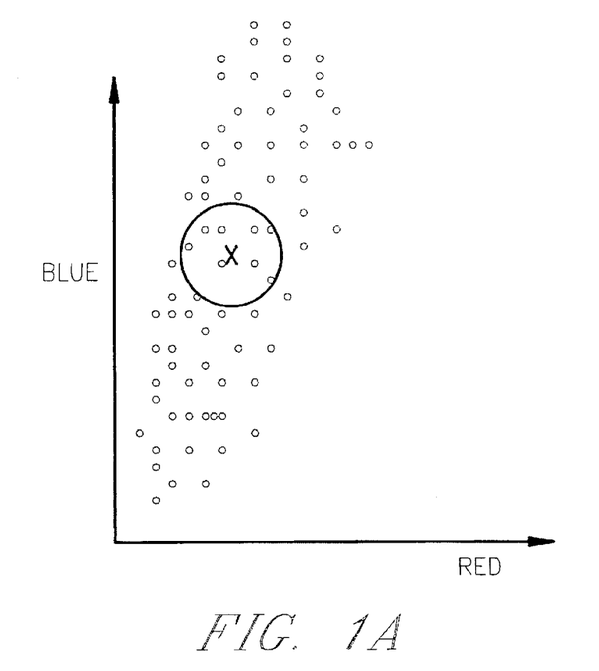
FIG. 1A is a graph of correlated points in feature space in terms of red and blue coordinate axes, wherein the correct answer to a hypothetical range query is enclosed by the circle centered at point X.
Figure 1B:
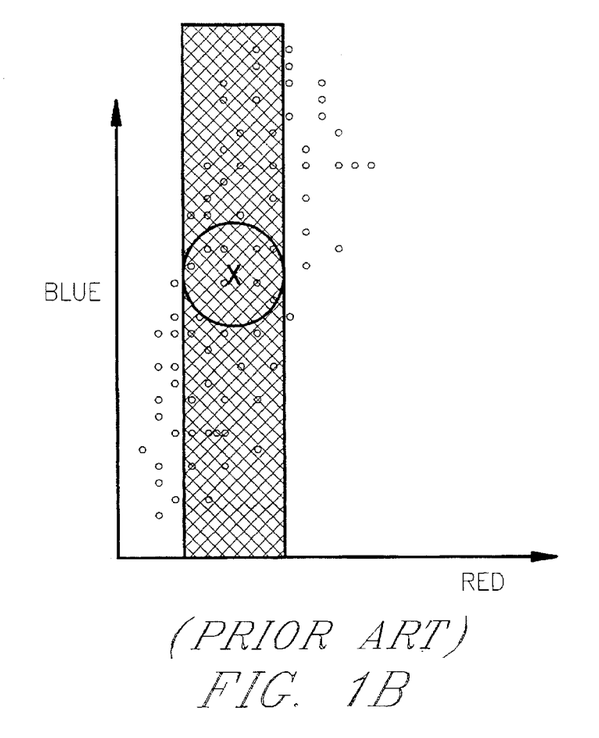
FIG. 1B is a graph of the same correlated points of FIG. 1A illustrating the naive truncation methods of the prior art, wherein the shaded region encompasses the answer set to the range query, indicating an answer set containing numerous false positives.

Attention is directed to FIG. 1A wherein color objects, symbolized as correlated feature vector data points on a red and blue axis, respectively, exist. The query would be "find all images similar to a sunset photograph", where there is a red sun and a lot of blue water and sky. A correct answer to a hypothetical range query wherein all answers having, for instance, 15 units of red and 45 units of blue, is indicated thereon as a circle centered at point X. FIG. 1B illustrates the same correlated data as in FIG. 1A illustrating the results achieved by a prior art truncation method. The shaded strip indicates the region wherein the retrieved hits are located. Note that excess false positives are indicated as an answer to the query.

Figure 1C:
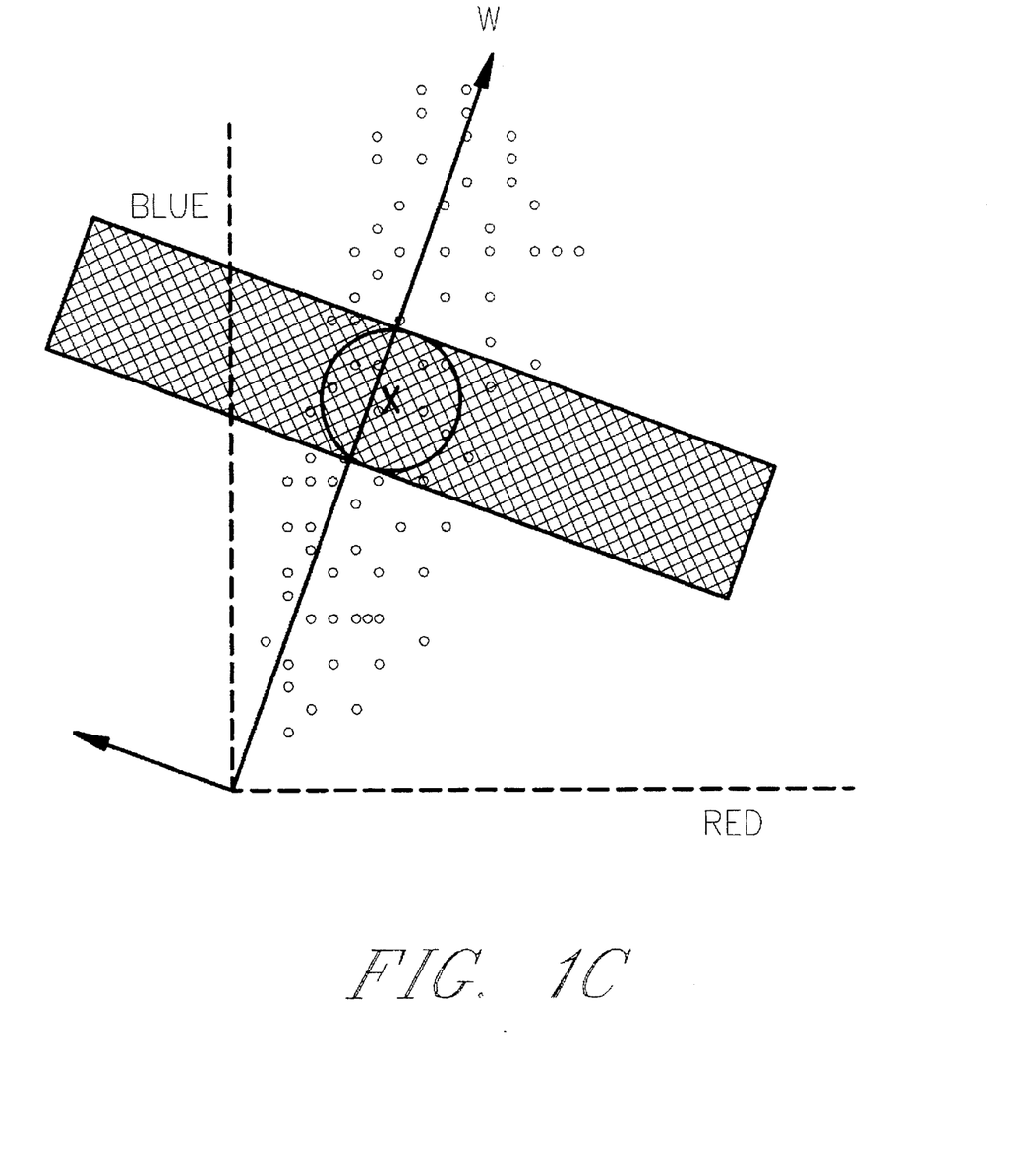
FIG. 1C is a graph of the same correlated points of FIGS. 1A and 1B illustrating the technique of the method of the present invention, wherein the shaded region includes the correct answer set, while containing a reduced number of initial false positives.

With reference to FIG. 10, (the method of the invention) which also illustrates the same correlated points as FIG. 1A with the same range query occurring in the transformed space, only the first coordinate has been kept, i.e., the W axis. The answer produced by the same range query in the truncated transformed feature space is indicated by the shaded region of FIG. 1C. Note that for the same range query, the shaded region containing the false hits contains fewer than the shaded region of the naive technique of FIG. 1B wherein only truncation has been performed.

In order to facilitate the implementation and understanding of the method of the preferred embodiment of the present invention, the following is provided for the method of the present invention. It should be understood that the following can be implemented in a variety of different computer languages on differing systems. Therefore, the following is not meant to be limiting but rather to be representative of the present method described and claimed herein.

```
/* given an Object O, return a truncated feature vector Trunc_Vector
PROCEDURE Object_2_TruncVector( Object O )
            /* map the object into a (long) feature vector
            Long_Vector = Get_Features ( Object O )
            /* perform the distance preserving transformation
            /* to concentrate information of vector on first few entries
            Long_Vector_Transformed = Transform( Long_Vector )
            /* keep only the first k entries
            Trunc_Vector = Long_Vector_Tranformed[1:k]
      return( Trunc_Vector )
/* insert the truncated vector in the database
PROCEDURE PAM_Insert( Trunc_Vector )
            /* perform a point-access-method insert then return
      return()
/* search database and return all Trunc_Vectors within a Distance
/* from the truncated vector
PROCEDURE PAM_Range_Search( Trunc_Query_Vector, Distance )
            /* perform a point-access-method search then return
      return()
/* routine to insert object
PROCEDURE Insert_Object( Object O )
            Trunc_Vector = Object_2_TruncVector( Object O )
            PAM_Insert( Trunc_Vector )
      return()
/* routing for conducting the similarity search
PROCEDURE Find_Similar_Objects( Query_Object, Distance )
            /* find the truncated vector of the query object
            Trunc_Vector = Object_2_TruncVector( Query_Object )
            /* find all truncated vectors within distance and discard false alarms
            for each vector returned by PAM_Search( Trunc_Vector, Distance )
                  Let Object correspond to the returned vector
                  if distance between (Query_Object, Object) <= Distance then
                        report Object as a match
      return()
```

In summary, a method is disclosed which achieves efficient and complete retrieval from a database of high-dimensionality points while guaranteeing completeness and reduces the propensity for false positives. The present method is mathematically equivalent to doing the range search on the original data, due to the use of the distance-preserving transformation, and due to the fact that the distance among truncated vectors is always less than or equal to the distance on the untruncated counterparts. The present method is more efficient than the mathematically equivalent range search, since the preliminary similarity search will be fast because it is of lower dimensionality, and since it will produce very few false positives because of the transform.

This invention may be embodied in other specific forms without departing from its spirit or essential characteristics. The above-described embodiments of the present invention are to be considered in all respects only as illustrative and not restrictive in scope. The scope of the invention is, therefore, indicated by the appended claims rather than by the above-detailed description. Therefore, all changes which come within the meaning and range of equivalency of the claims are to be considered embraced within their scope.

What is claimed and desired to be secured by United States Letters Patent is:

1. A method for indexing in a database of stored objects, the method comprising the steps of:

a) applying a set of feature extraction functions to extract a set of feature vectors from the stored objects in the database, the set of feature extraction functions having a similarity measure applicable to the stored objects;

b) transforming the set of extracted feature vectors using an orthonormal transform such that the similarity measure is preserved, and such that the information of the set of extracted feature vectors is segregated into (i) a subset of the transformed feature vectors in which information of the set of extracted feature vectors is concentrated, and (ii) entries which contribute little to the information of the transformed vectors;

c) truncating the transformed feature vectors such that the entries which contribute little to the information of the transformed vectors are removed; and d) indexing the truncated feature vectors using a non-sequential point-access-method (PAM).

2. A method for indexing as defined in claim 1 further comprising the step of conducting a similarity search on the indexed set of truncated transformed feature vectors to retrieve a set of vectors which represent a superset of objects including desired objects and false positives.

3. A method for indexing as defined in claim 2 further comprising the step of performing a secondary search on the retrieved set of vectors to eliminate the false positives.

4. A method for indexing as defined in claim 1 wherein the step of transforming includes using an orthogonal transform.

5. A method as recited in claim 1, wherein the step of transforming the extracted feature vectors includes utilizing a transform from the set consisting of (i) data-dependent orthonormal transforms, (ii) a Discrete Cosine Transform, (iii) a Harr transform, and (iv) a Wavelet transform.

6. A method for identifying similar ones of stored objects in a database, the method comprising the steps of:

a) identifying a subset of objects in the database, the subset including the similar objects to be identified;

b) indexing said subset of similar objects, the step of indexing comprising the steps of:

applying a set of feature extraction functions to extract a set of feature vectors, having respective sets of entries, from the stored objects in the database, the set of feature extraction functions having a similarity measure applicable to the stored objects;

transforming the extracted feature vectors using an orthonormal transform such that the similarity measure is preserved, and such that the information of the extracted feature vectors is segregated into (i) a subset of the transformed feature vectors in which information of the set of extracted feature vectors is concentrated, and (ii) entries which contribute little to the information of the transformed vectors;

truncating the transformed feature vectors to obtain a subset of the entries of the feature vectors such that the entries which contribute little to the information of the transformed vectors are removed; and indexing the truncated feature vectors using a non-sequential point-access-method (PAM);

c) conducting a preliminary similarity search on the indexed set of truncated transformed feature vectors to retrieve a set of vectors which represent a superset of objects including desired objects and false positives; and d) performing a secondary search on the retrieved set of vectors to eliminate the false positives.

7. A method for indexing as defined in claim 6 wherein the step of transforming includes using an orthonormal transform.

8. A method as recited in claim 6, wherein the step of transforming the extracted feature vectors includes utilizing a transform from the set consisting of (i) data-dependent orthonormal transforms, (ii) a Discrete Cosine Transform, (iii) a Harr transform, and (iv) a Wavelet transform.

9. A database computer system containing multi-dimensional objects, the system comprising:

a) at least one storage device for storing said objects;

b) a computer processor for controlling access to said stored objects;

c) memory coupled to said computer processor for access thereto; and d) program means, executable by the computer processor, for performing the steps of:

applying a set of feature extraction functions to extract a set of feature vectors, having respective sets of entries, from the stored objects in the database, the set of feature extraction functions having a similarity measure applicable to the stored objects;

transforming the extracted feature vectors using an orthonormal transform such that the similarity measure is preserved, and such that the information of the extracted feature vectors is segregated into (i) a subset of the transformed feature vectors in which information of the set of extracted feature vectors is concentrated, and (ii) entries which contribute little to the information of the transformed vectors;

truncating the transformed feature vectors to obtain a subset of the entries of the feature vectors such that the entries which contribute little to the information of the transformed vectors are removed; and indexing the truncated feature vectors using a non-sequential point-access-method (PAM).

10. A system as recited in claim 9, wherein the program means for performing the step of transforming the extracted feature vectors includes means for utilizing a transform from the set consisting of (i) data-dependent orthonormal transforms, (ii) a Discrete Cosine Transform, (iii) a Harr transform, and (iv) a Wavelet transform.

11. A computer program product, for use in a database computer system containing stored objects, the computer program product comprising:

a) a recording medium; and b) means, recorded on said medium, for instructing said computer system to perform the steps of:

applying a set of feature extraction functions to extract a set of feature vectors, having respective sets of entries, from the stored objects in the database, the set of feature extraction functions having a similarity measure applicable to the stored objects;

transforming the extracted feature vectors using an orthonormal transform such that the similarity measure is preserved, and such that the information of the extracted feature vectors is segregated into (i) a subset of the transformed feature vectors in which information of the set of extracted feature vectors is concentrated, and (ii) entries which contribute little to the information of the transformed vectors;

truncating the transformed feature vectors such that the entries which contribute little to the information of the transformed vectors are removed;

indexing the truncated feature vectors using a non-sequential point-access-method (PAM);

conducting a preliminary similarity search on the indexed set of truncated transformed feature vectors to retrieve a set of vectors which represent a superset of objects including desired objects and false positives; and performing a secondary search on the retrieved set of vectors to eliminate the false positives.

12. A computer program product as recited in claim 11, wherein the means for instructing to transform the extracted feature vectors includes means for instructing the system to utilize a transform from the set consisting of (i) data-dependent orthonormal transforms, (ii) a Discrete Cosine Transform, (iii) a Harr transform, and (iv) a Wavelet transform.

* * * * *